(12) United States Patent
Kurotsu (10) Patent No.: US 10,771,644 B2
(45) Date of Patent: Sep. 8, 2020

(54) IMAGE READING DEVICE AND INDICATION TOOL

(71) Applicant: KYOCERA Document Solutions Inc., Osaka (JP)

(72) Inventor: Yoshihiko Kurotsu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/415,029

(22) Filed: May 17, 2019

(65) Prior Publication Data

US 2019/0356798 A1   Nov. 21, 2019

(30) Foreign Application Priority Data

May 18, 2018 (JP) .................................. 2018-096239

(51) Int. Cl.
| | | |
|---|---|---|
| *G06F 15/00* | (2006.01) | |
| *H04N 1/00* | (2006.01) | |
| *H04N 1/10* | (2006.01) | |

(52) U.S. Cl.
CPC ..... *H04N 1/00663* (2013.01); *H04N 1/00557* (2013.01); *H04N 1/1061* (2013.01)

(58) Field of Classification Search
CPC ........... H04N 1/00663; H04N 1/00557; H04N 1/1061
USPC ....................................................... 358/474
See application file for complete search history.

(56) References Cited

U.S. PATENT DOCUMENTS

| | | | |
|---|---|---|---|
| 8,928,953 B2 * | 1/2015 | Shibata | H04N 1/00559 358/474 |
| 9,781,282 B2 | 10/2017 | Fukuhara et al. | |
| 2013/0258422 A1 * | 10/2013 | Yamamoto | H04N 1/1061 358/474 |
| 2015/0009518 A1 * | 1/2015 | Kashiwagi | H04N 1/00708 358/1.13 |
| 2015/0294540 A1 * | 10/2015 | Hori | B60K 35/00 340/815.45 |
| 2016/0373598 A1 | 12/2016 | Fukuhara et al. | |

FOREIGN PATENT DOCUMENTS

| | | |
|---|---|---|
| JP | 2006-060539 A | 3/2006 |
| JP | 2017-203956 A | 11/2017 |

* cited by examiner

*Primary Examiner* — Mark R Milia
(74) *Attorney, Agent, or Firm* — Studebaker & Brackett PC (57) ABSTRACT

An image reading device includes an image reading section, a document table, a document pressing member, and a document size indication section. The image reading section reads an image of a document. The document table is located above the image reading section. The document is loaded on the document table. The document pressing member is provided over the document table in an openable and closable manner to press the document. The document size indication section is located on the document table and indicates a plurality of document sizes. The document size indication section is constituted by a semitransparent resin plate and includes a letter presenting portion. A part of the semitransparent resin plate of the document size indication section corresponding to the letter presenting portion has a smaller thickness than a part of the document size indication section other than the part thereof corresponding to the letter presenting portion.

8 Claims, 12 Drawing Sheets

IMAGE READING DEVICE AND INDICATION TOOL

INCORPORATION BY REFERENCE

The present application claims priority under 35 U.S.C. § 119 to Japanese Patent Application No. 2018-096239, filed on May 18, 2018. The contents of this application are incorporated herein by reference in their entirety.

BACKGROUND

The present disclosure relates to an image reading device including a document size indication section that is easy to view and an indication tool.

An image reading device includes a document table and a document pressing member. A document is loaded on the document table above an image reading section. The document pressing member is provided over the document table in an openable and closable manner. A document size indication section that indicates document sizes is provided on an upper rear part of the document table.

The document size indication section is a sticker indicating the document sizes and is attached to the upper rear part of the document table to be disposed at the upper rear part of the document table.

However, the work of sticker attachment is very bothersome and difficult.

The document size indication section is provided on the rear part of the document table. This may also involve difficulty in viewing the document size indication section from the front.

Under such circumstances, another image reading device is proposed in which a surface of the document table is inclined at a position where a size indication sticker is attached. The size indication sticker is attached to the inclined surface.

However, the document size indication section is provided by attaching the size indication sticker to the document table even in the other image reading device. For a reason such as above, an operation to set the document size indication section is still bothersome and may precipitate an increase in cost.

Similarly, a lid of a container of a laser oscillator has surfaces different in roughness in some cases in order to increase visibility of a warning message integrated with the lid.

As described above, although various contrivances are provided in order to increase visibility of for example characters for a user, it is still difficult to recognize the characters according to location of the characters or a color of a resin plate or the like.

SUMMARY

An image reading device according to an aspect of the present disclosure includes: an image reading section that reads an image of a document; a document table located above the image reading section, the document to be loaded on the document table; and a document pressing member provided over the document table in an openable and closable manner to press the document. The image reading device includes a document size indication section. The document size indication section is located on the document table and indicates a plurality of document sizes. The document size indication section is constituted by a semitransparent resin plate and includes a letter presenting portion. The letter presenting portion is a portion of the semitransparent resin plate that presents a letter. A part of the semitransparent resin plate of the document size indication section corresponding to the letter presenting portion has a smaller thickness than a part of the semitransparent resin plate of the document size indication section other than the part thereof corresponding to the letter presenting portion.

An indication tool according to an aspect of the present disclosure includes an indication section and an irradiation section that emits light from a back of the indication section for irradiation. The indication section is constituted by a transparent resin plate. The indication section includes a letter presenting portion on an upper part of the indication tool. The letter presenting portion is a portion of the indication section that presents a letter including a pictorial symbol. A part of the semitransparent resin plate of the indication section corresponding to the letter presenting portion has a smaller thickness than a part of the indication section other than the part thereof corresponding to the letter presenting portion.

DETAILED DESCRIPTION

The following describes a mode (also referred to below as an "embodiment") for implementing the present disclosure with reference to the accompanying drawings. It should be noted that elements that are the same are labelled using the same reference signs.

Figure 1:
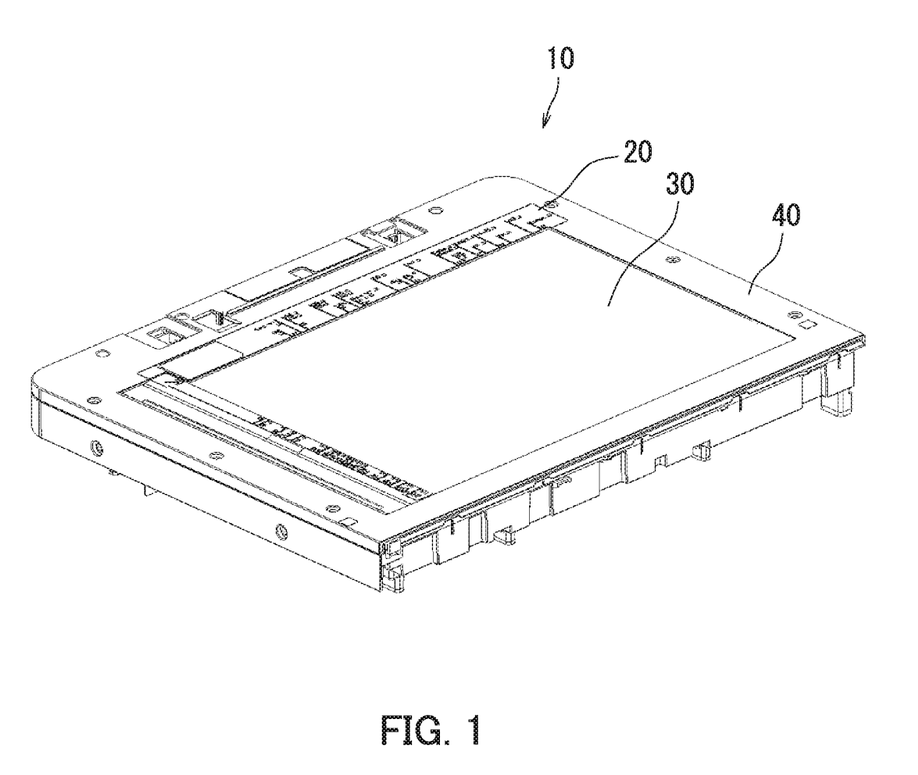
FIG. 1 is a perspective view illustrating an example of an image reading device according to the present disclosure.

FIG. 1 is a perspective view illustrating an example of an image reading device in the present disclosure. As illustrated in FIG. 1, description is made herein using the image reading device as an example to which an indication tool is applied. However, the indication tool is applicable to any device that includes an indication section at an upper part thereof, such as image forming apparatus, a landline telephone, an automated teller machine (ATM), and a vending machine.

An image reading device 10 according to the present disclosure includes an image reading section 40, a document table 30, a document pressing member (not illustrated), and a document size indication section 20. The image reading section 40 reads an image of a document. The document table 30 is located above the image reading section 40. The document is loaded on the document table 30. The document pressing member is provided over the document table 30 in an openable and closable manner to press the document.

The image reading section 40 includes a frame formed of a synthetic resin, a surface-treated steel plate having a surface to which a coating is applied, or the like. The image reading section 40 has a wide central opening. A glass platen is fitted in the central opening of the image reading section 40 to serve as the document table 30.

The document pressing member is usually closed. The document pressing member is secured to a rear part of the image reading section 40 in an operable and closable manner. When a front part of the document pressing member is pulled up, a hinge at a rear part of the document pressing member turns to enable a user to view the document table 30 and the document size indication section 20. The document size indication section 20 is located on the document table 30. The document size indication section 20 indicates a plurality of document sizes.

Figure 2:
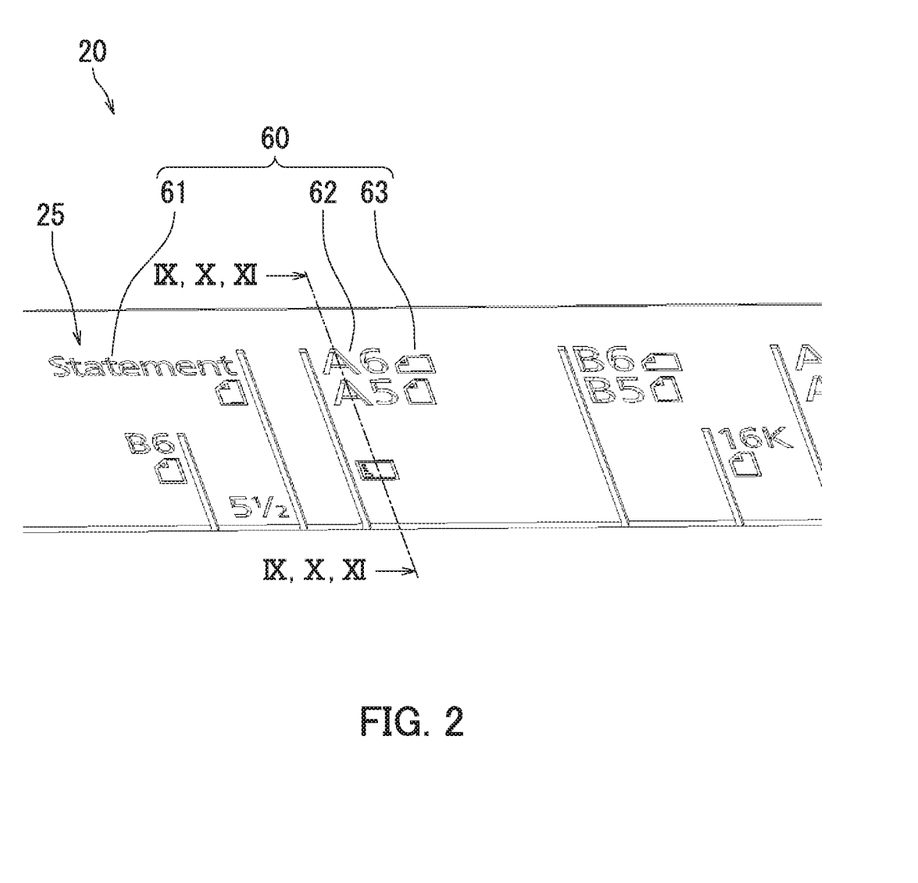
FIG. 2 is an enlarged view illustrating an example of a document size indication section (particularly, a pictorial symbol presenting portion)

FIG. 2 is an enlarged view illustrating an example of the document size indication section 20 (particularly, a pictorial symbol presenting portion 60).

The document size indication section 20 includes a letter presenting portion 25.

Characters, illustrations, and the like indicating the document sizes are presented in the document size indication section 20 as illustrated in FIG. 2. In the following description, a part of the document size indication section 20 presenting the characters, the illustrations, and the like indicating the document sizes may be simply and collectively referred to as the "letter presenting portion 25".

In FIG. 2, the letter presenting portion 25 includes the pictorial symbol presenting portion 60 presenting a pictorial symbol. Examples of the pictorial symbol presenting portion 60 include a character string presenting portion 61, a sheet size presenting portion 62, and a sheet orientation presenting portion 63. That is, the letter presenting portion 25 includes for example a portion presenting a character string, a portion presenting a symbol, a portion presenting a sheet orientation, a portion presenting an illustration, a portion presenting a scale, and a portion presenting a separator line, such as above.

The document size indication section 20 is made from a semitransparent resin in the present disclosure. The pictorial symbol presenting portion 60 of the letter presenting portion 25 is a portion engraved in a semitransparent resin plate 26. A part of the semitransparent resin plate of the document size indication section 20 corresponding to the letter presenting portion 25 has a smaller thickness than a part thereof other than the portion corresponding to the letter presenting portion 25. In other words, the thickness of the part of the semitransparent resin plate of the document size indication section 20 corresponding to the letter presenting portion 25 is smaller than the thickness of the other part thereof. In the above configuration, the letter presenting portion 25 is engraved in relief to the document size indication section 20 so as to be visible. That is, the part of the resin-made document size indication section 20 corresponding to the letter presenting portion 25 (the pictorial symbol presenting portion 60) is thin, with a result that the letter presenting portion 25 has a) light-concentrating edge to cause the pictorial symbol presenting portion 60 to be clearly visible.

Specifically, a recess is formed at a part of the semitransparent resin plate where the letter presenting portion is to be located. In the above configuration, the thickness of a part of the semitransparent resin plate corresponding to the letter presenting portion 25 can be smaller than the thickness of the other part thereof.

Through the formation of the letter presenting portion 25 by forming a recess in the semitransparent resin plate, a reflection angle of light is changed at the edge of the recess to enhance appearance of the edge of the recess. Accordingly, the letter presenting portion 25 is in sharp relief to the document size indication section 20 so as to be easily visible.

In the present embodiment, the document size indication section 20 as described above is a plate formed from a semitransparent resin rather than a sticker or tape. Therefore, the document size indication section 20 retains a shape thereof. Furthermore, the document size indication section 20 can be secured at a part near a rear edge of the image reading section 40 by means of a securing member such as a screw Therefore, it is rather easy to attach the document size indication section 20 to the image reading section 40. If a screw hole is formed in the image reading section 40 in advance, it can be ensured that the document size indication section 20 is set at a specific position. In other words, the document size indication section 20, which is a resin plate formed from the semitransparent resin, can be easily laid and set by means of for example a screw.

Figure 3:
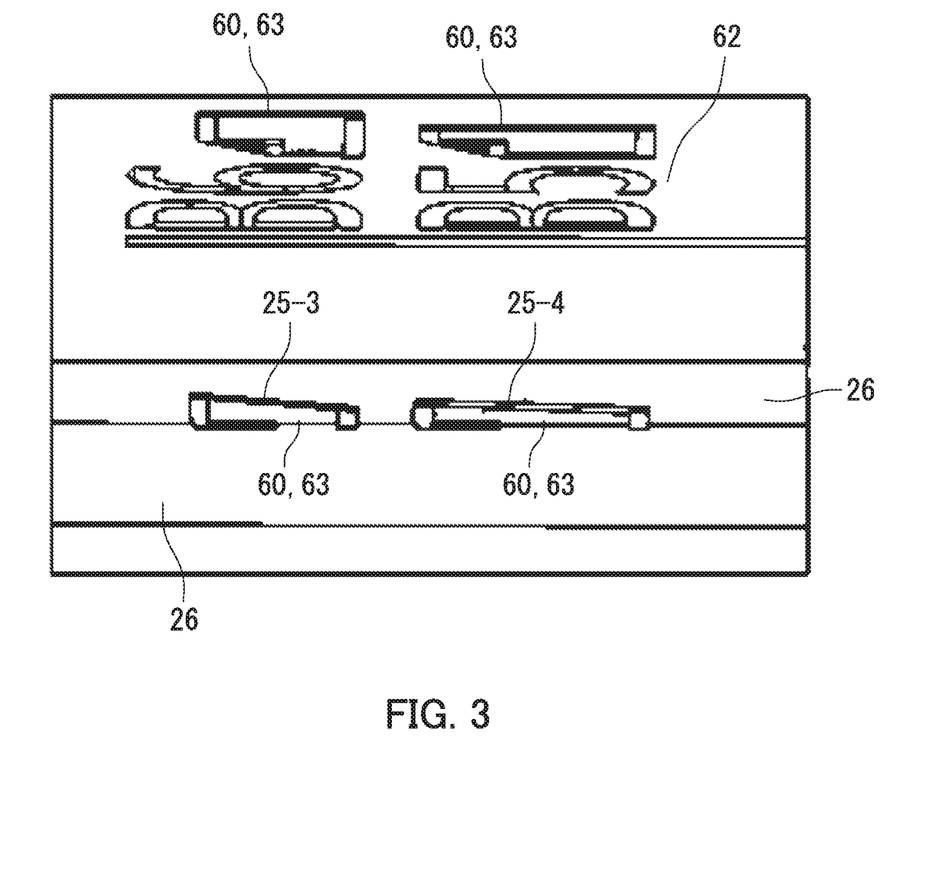
FIG. 3 is a schematic diagram illustrating a cross-section of the document size indication section (particularly, the pictorial symbol presenting portion).

FIG. 3 is a schematic diagram illustrating a cross-section of the document size indication section 20 (particularly, the pictorial symbol presenting portion 60). Specifically, a cross-section of the document size indication section 20 is illustrated in a lower half part of FIG. 3.

The thickness of the part of the document size indication section 20, which is the semitransparent resin plate 26, corresponding to the letter presenting portion 25 decreases toward a rear from a front of the image reading device 10 according to the present disclosure. For example, as illustrated in FIG. 3, a rear letter presenting portion 25-3 and a front letter presenting portion 25-4 are engraved in the document size indication section 20 so as to increase in engraved depth toward the rear from the front. In the above configuration, the document size indication section 20 can have a form in which the thickness of a part of the semitransparent resin plate 26 corresponding to a front part of the letter presenting portion 25 is large, whereas the thickness decreases toward the rear. The document size indication section 20 having a configuration as described above is thin at a part corresponding to the rear letter presenting portion 25-3, which is usually hard to view. Thus, the rear letter presenting portion 25-3 can be easily viewed. Moreover, a part of the semitransparent resin plate 26 surrounding the pictorial symbol presenting portion 60 is smaller in thickness than a part of the semitransparent resin plate 26 other than the part thereof surrounding the pictorial symbol presenting portion 60. This can increase visibility of the pictorial symbol presenting portion 60. Examples of the pictorial symbol presenting portion 60 include the character string presenting portion 61, the sheet size presenting portion 62, the sheet orientation presenting portion 63, and an icon presenting portion (see FIG. 2). The pictorial symbol presenting portion 60 also includes a straight line portion indicating a sheet size.

Figure 4:
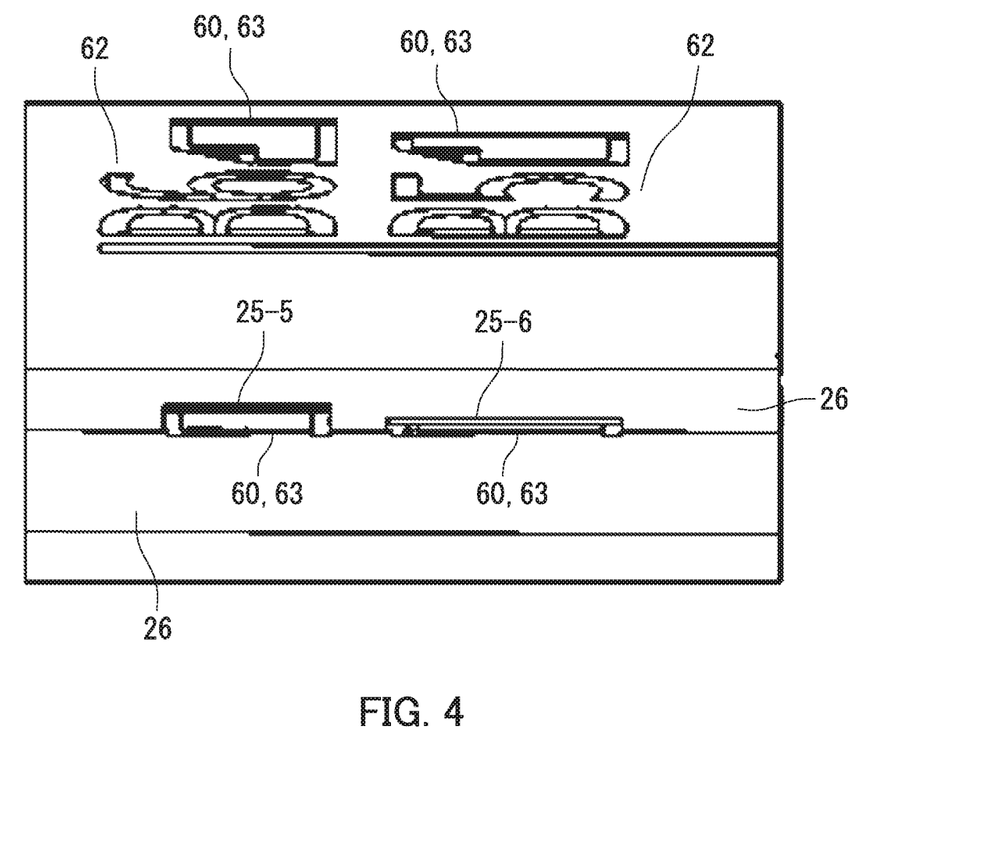
FIG. 4 is a schematic diagram illustrating a cross-section of another aspect of the document size indication section (particularly, the pictorial symbol presenting portion).

FIG. 4 is a diagram schematically illustrating a cross-section of another aspect of the document size indication section 20 (particularly, the pictorial symbol presenting portion 60) according to the present disclosure. Specifically, a cross-section of the document size indication section 20 is illustrated in a lower half part of FIG. 4.

By engraving a front letter presenting portion 25-6 shallowly while engraving a rear letter presenting portion 25-5 deeply, the letter presenting portion 25 located in the rear, which is usually hard to view, can be easily viewed.

Figure 5:
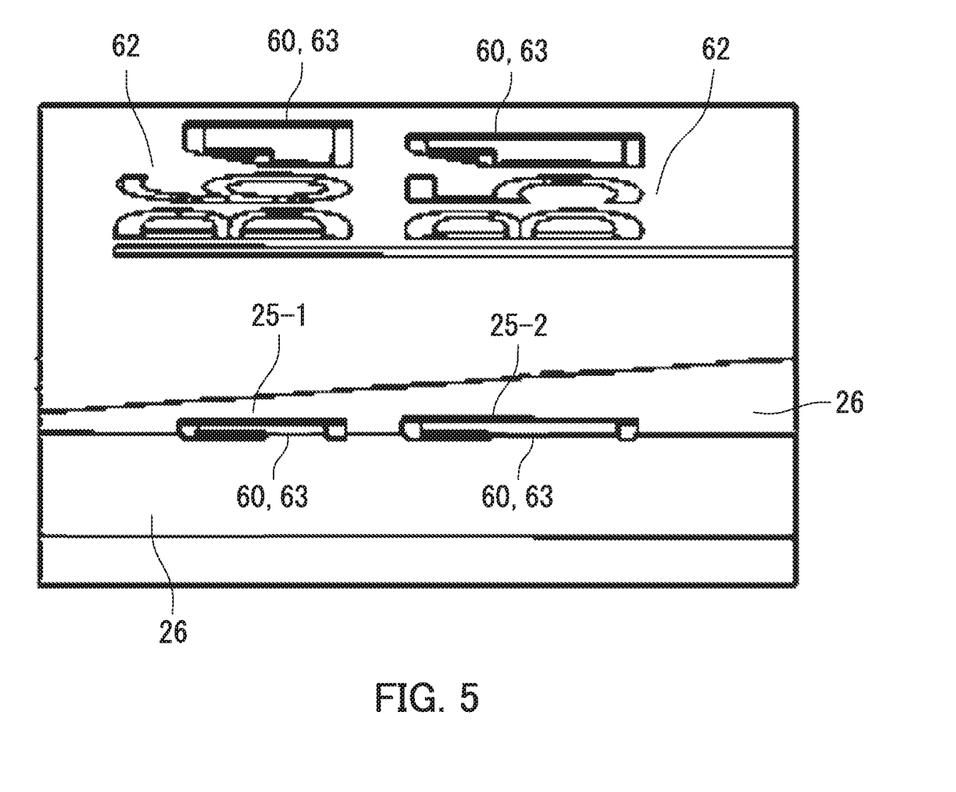
FIG. 5 is a schematic diagram illustrating a cross-section of yet another aspect of the document size indication section (particularly, the pictorial symbol presenting portion).

FIG. 5 is a schematic diagram illustrating a cross-section of yet another aspect of the document size indication section 20 (particularly, the pictorial symbol presenting portion 60) according to the present disclosure. Specifically, a cross-section of the document size indication section 20 is illustrated in a lower half part of FIG. 5.

As illustrated in FIG. 5, the semitransparent resin plate 26 is laid in advance so as to have an inclined shape in which a front part thereof is thick and a rear part thereof is thin. A rear letter presenting portion 25-1 and a front letter presenting portion 25-2 are engraved therein. In the above configuration, it is possible that a part of the semitransparent resin plate 26 corresponding to the rear letter presenting portion 25-1 is thin while a part thereof corresponding to the front letter presenting portion 25-2 is thick. As a result, a surface part of the semitransparent resin plate 26 located on the rear letter presenting portion 25-1, which is hard to view; can be thin.

As described above, by thinning a part of the semitransparent resin plate 26 corresponding to the letter presenting portion 25 located in the rear, visibility of the letter presenting portion 25 can be significantly increased. It should be noted that the right side is the front side and the left side is the rear side in each of FIGS. 3 to 5.

An example described with reference to FIG. 5 presents a case in which the thickness of the semitransparent resin plate 26 is decreased toward the rear. It is also possible that the thickness of the semitransparent resin plate 26 is decreased toward the rear and the thickness of a part of the semitransparent resin plate 26 corresponding to a rear part of the letter presenting portion 25 is decreased by combining the examples described with reference to FIGS. 3 to 5.

Although the term "engrave" is used in the above description, the letter presenting portion 25 is not necessarily formed by engraving. A recess corresponding to the engraved portion may be formed with a thermoplastic resin using a die having a protrusion corresponding to the recess.

The semitransparent resin in the present disclosure is preferably a resin having for example a transmittance ranging from 5% to 95%. Use of the semitransparent resin plate 26 as described above can change a refracting angle of light at the edge of the letter presenting portion 25 to enable the edge of the letter presenting portion 25 to be sharply visible. A resin having low transparency can be used for the semitransparent resin plate 26 to exhibit an inherent property of the semitransparent resin plate 26. Alternatively, a transparent resin may be blended with a filler or the like to adjust the transparency of the semitransparent resin plate 26. When a surface part of the document size indication section 20 corresponding to the letter presenting portion 25 is increased in roughness, at least the surface part thereof corresponding to the letter presenting portion 25 can be partially semitransparent. It is sufficient that at least a part of the document size indication section 20 corresponding to the letter presenting portion 25 be semitransparent. However, the entire part thereof may be semitransparent and is usually semitransparent.

The document size indication section 20 may be secured to the image reading section 40 for example by means of a screw in the present disclosure.

Figure 6:
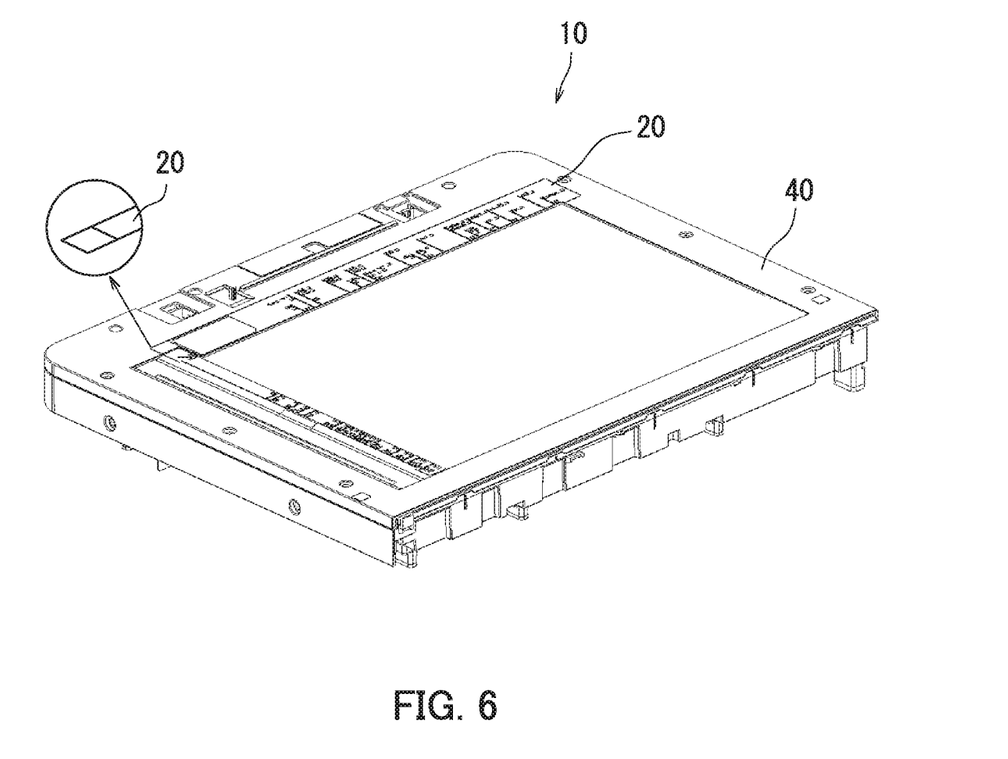
FIG. 6 is a diagram schematically illustrating a state in which the document size indication section becomes flat along a document table by pushing down a document pressing member in the present disclosure.
Figure 7:
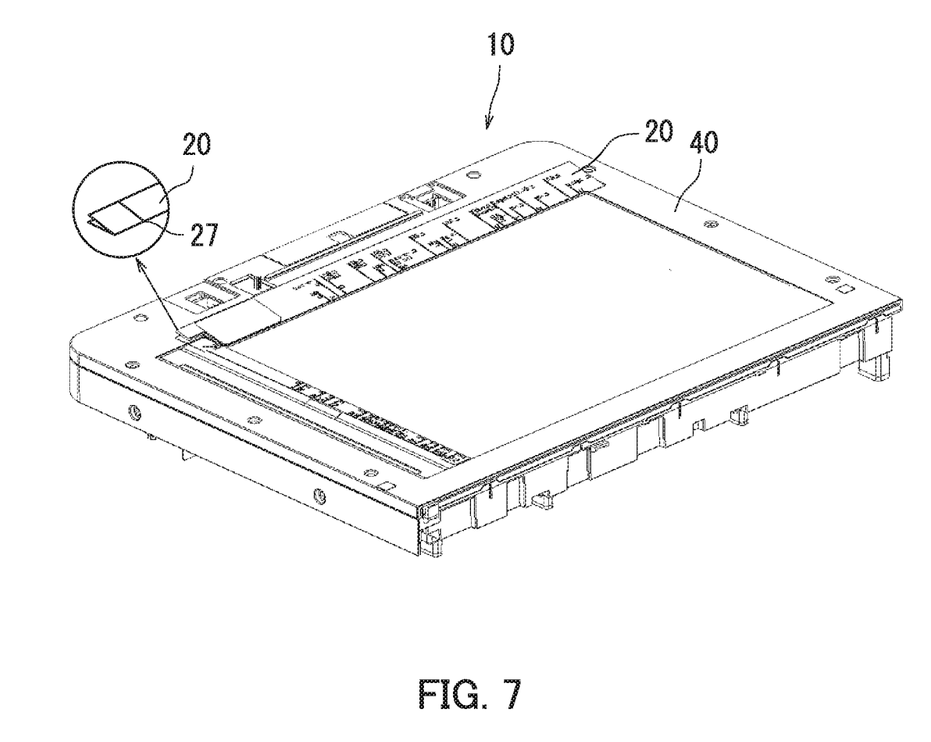
FIG. 7 is a diagram schematically illustrating a state in which the document size indication section stands aslant by pulling up the document pressing member in the present disclosure.

Furthermore, as illustrated in FIG. 6, when the document pressing member (not illustrated) is pushed down, the document size indication section 20 becomes flat along the document table 30 through a hinge 27, which is provided at a front part of the document size indication section 20, by being pressed by the document pressing member. It is possible by contrast that by pulling up a front part of the document pressing member to open the document pressing member, a rear part of the document size indication section 20 is pushed up to cause the document size indication section 20 to stand entirely aslant as illustrated in FIG. 7. Through the document size indication section 20 standing aslant by raising the rear part of the document size indication section 20, reflection efficiency of the letter presenting portion 25 is increased with a result that the letter presenting portion 25 is sharply visible. That is, reflection efficiency of the pictorial symbol presenting portion 60 is increased. When the document pressing member is closed, the entire document size indication section 20 becomes flat along the document table 30 by being pushed downward by the document pressing member.

It is preferable that the document size indication section 20 is held in an upwardly urged state for example by an elastic member such as a spring, which is provided in advance, so that the document size indication section 20 moves in association with the document pressing member.

Figure 8:
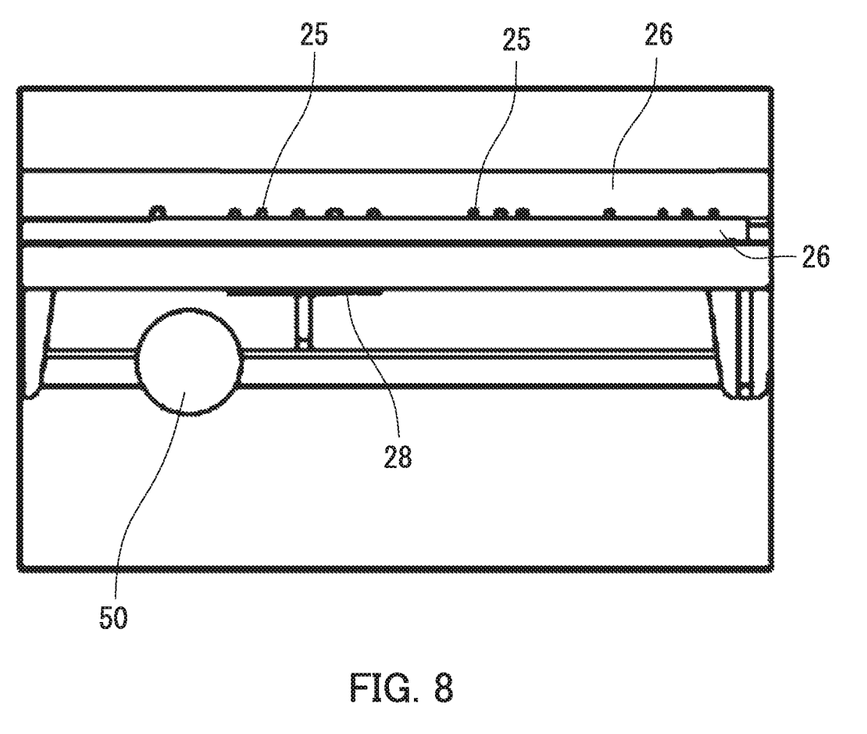
FIG. 8 is a schematic diagram illustrating an example of a manner in which a light emitting body is provided in the present disclosure.

The image reading device 10 according to the present disclosure preferably includes a light emitting body 50 under the semitransparent resin plate 26 as illustrated in FIG. 8. No specific limitations are placed on the light emitting body 50, and a light emitting diode (LED) can be used as the light emitting body 50, for example.

The light emitting body 50 is turned on when the document pressing member is opened, and turned off when the document pressing member is closed.

Preferably, the image reading device 10 further includes a light guide 28 as illustrated in FIG. 8. The light guide 28 is located between the light emitting body 50 and the semitransparent resin plate 26 constituting the document size indication section 20. The light guide 28 is located in the vicinity of the light emitting body 50. Light from the light emitting body 50 travels through the semitransparent resin plate 26 via the light guide 28 to reach the letter presenting portion 25 in the semitransparent resin plate 26. The refracting angle of the light from the light emitting body 50 changes at the edge of the letter presenting portion 25, which is a void space. This can make the edge of the letter presenting portion 25 to be in relief to increase visibility of the letter presenting portion 25. Note that any light guide that is widely used in devices such as the image reading device 10, such as a resin having a light scattering property, can be selected as appropriate for use for the light guide 28.

In the image reading device 10 according to the present disclosure having a configuration as described above, a refracting angle of light changes at the edge of the letter presenting portion 25. Thus, appearance of the edge of the letter presenting portion 25 can be enhanced and the edge thereof can be visible. As a result, indication means such as characters, illustrations, size signs, separators, and the like presented in the document size indication section 20 can be sharply visible.

In addition, the document size indication section 20 is constituted by a resin plate, and therefore, can be laid in an easy manner. A cost increase accompanied by operation to provide the document size indication section 20 can accordingly be obviated.

The image reading device according to the present disclosure has a configuration as described above. However, the present disclosure may be implemented in various different forms so long as there is no substantial deviation from the essence of the present disclosure (for example, sections (1) to (4) below).

Figure 9:
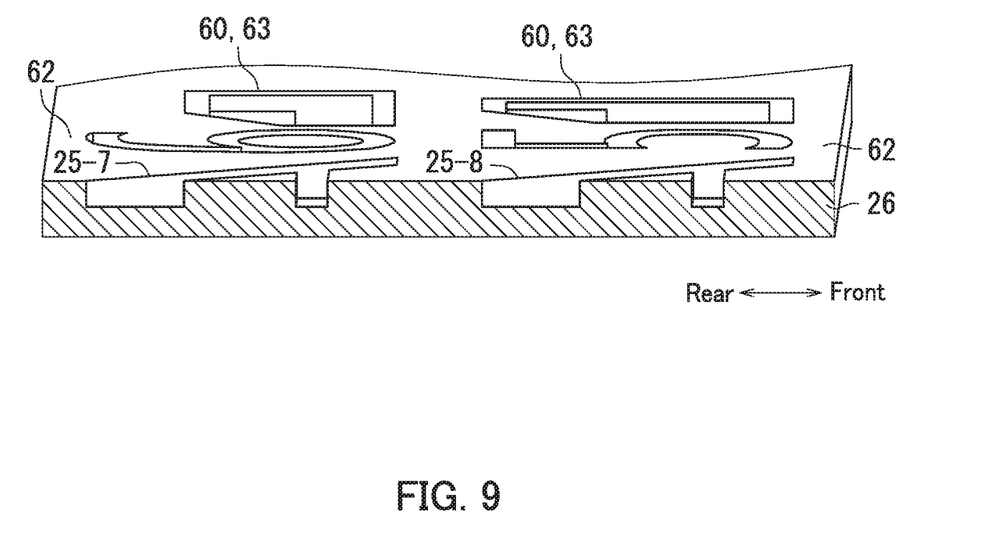
FIG. 9 is a schematic cross-sectional perspective view of the document size indication section taken along a line IX-IX in FIG. 2.

(1) FIG. 9 is a schematic cross-sectional perspective view of the document size indication section 20 taken along a line IX-IX in FIG. 2. As illustrated in FIG. 9, a part of the resin-made document size indication section 20 corresponding to the letter presenting portion 25 is thin. Specifically, the thickness of a part of the semitransparent resin plate 26 of the document size indication section 20 corresponding to the letter presenting portion 25 is smaller than the thickness of the other part thereof. For example, parts thereof corresponding to letter presenting portions 25-7 and 25-8 are thinner than the other part thereof. Thus, the letter presenting portion 25 has a light-concentrating edge to cause the letter presenting portion 25 to be clearly visible.

Figure 10:
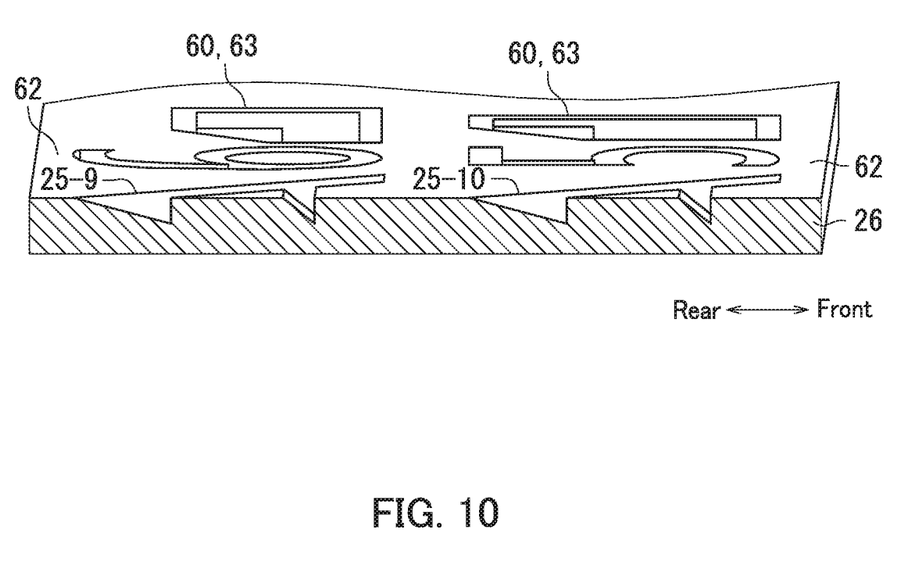
FIG. 10 is a schematic cross-sectional perspective view of the document size indication section taken along a line X-X in FIG. 2.

(2) FIG. 10 is a schematic cross-sectional perspective view of the document size indication section 20 taken along a line X-X in FIG. 2. As illustrated in FIG. 10, the thickness of a part of the document size indication section 20, which is the semitransparent resin plate 26, corresponding to the letter presenting portion 25 increases toward a rear from a front of the image reading device 10. For example, letter presenting portions 25-9 and 25-10 are engraved in the document size indication section 20 so as to decrease their engraved depth toward the rear from the front. In the above configuration, the document size indication section 20 can have a configuration in which the thickness of the semitransparent resin plate 26 is small in a front part of the letter presenting portion 25, whereas it increases toward the rear of the letter presenting portion 25. As a consequence, the front part of the letter presenting portion 25 of the semitransparent resin plate 26 is more conspicuous than a rear part thereof, with a result that the rear part of the letter presenting portion 25 can be easily viewed.

Figure 11:
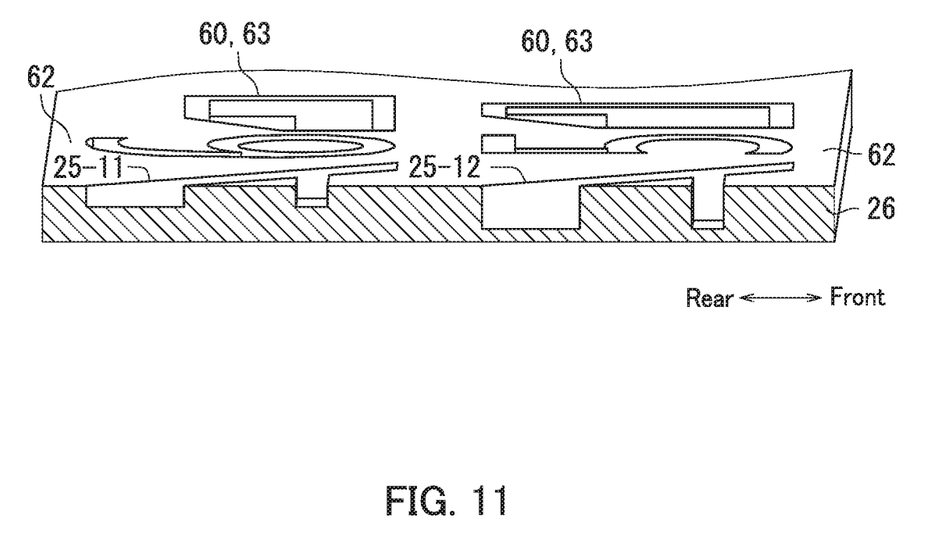
FIG. 11 is schematic cross-sectional perspective view of the document size indication section taken along a line XI-XI in FIG. 2.

(3) FIG. 11 is a schematic cross-sectional perspective view of the document size indication section 20 taken along a line XI-XI in FIG. 2. As illustrated in FIG: 11, a part of the document size indication section 20, which is the semitransparent resin plate 26, corresponding to a letter presenting portion 25 located in front is engraved shallower than a part thereof corresponding to a letter presenting portion 25 located in rear. For example, a front letter presenting portion 25-12 is engraved deeply while a rear letter presenting portion 25-11 is engraved shallowly. In the above configuration, the document size indication section 20 can have a configuration in which a part of the semitransparent resin plate 26 corresponding to the front letter presenting portion 25-12 is thin While a part thereof corresponding to the rear letter presenting portion 25-11 is thick. Thus, the letter presenting portion 25 located in the rear, which is usually hard to view, can be easily viewed.

Figure 12:
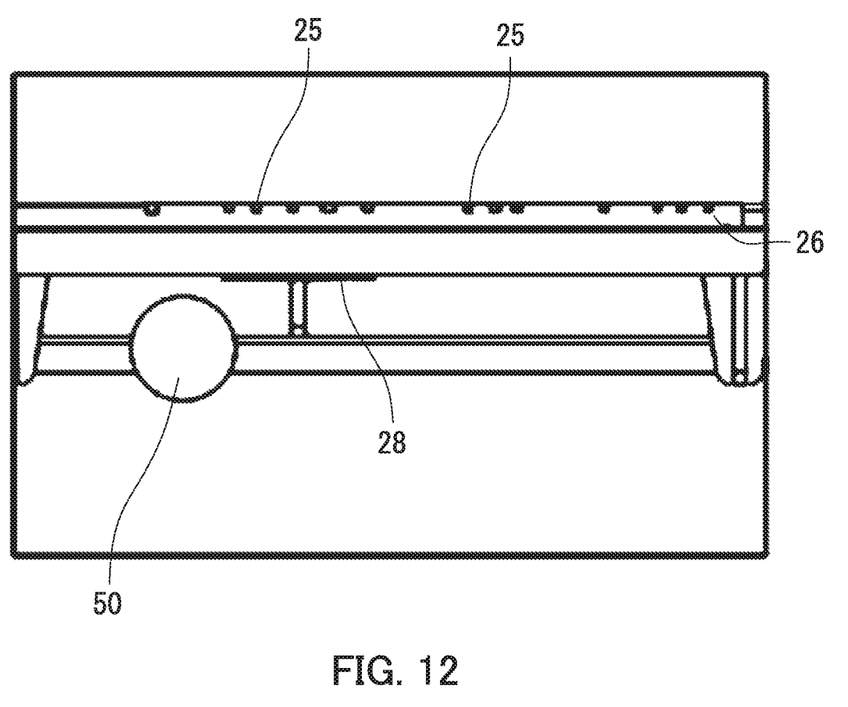
FIG. 12 is a schematic diagram illustrating another example of a manner in which the light emitting body is provided.

(4) FIG. 12 is a schematic diagram illustrating another example of an aspect in which the light emitting body 50 is provided. As illustrated in FIG: 12, the letter presenting portion 25 of the document size indication section 20 is a void space in the semitransparent resin plate 26. Light from the light emitting body 50 changes in refracting angle at the edge of the letter presenting portion 25 which is the void space. This can make the edge of the letter presenting portion 25 to be in relief to increase visibility of the letter presenting portion 25.

What is claimed is:

1. An image reading device comprising:
    an image reading section configured to read an image of a document;
    a document table that is located above the image reading section and on which the document is to be loaded;
    a document pressing member provided over the document table in an openable and closable manner to press the document; and
    a document size indication section located on the document table and configured to indicate a plurality of document sizes, wherein
    the image reading section includes a frame having a central opening,
    the document size indication section is constituted by a semitransparent resin plate and includes a letter presenting portion, the letter presenting portion being a portion of the semitransparent resin plate that presents a letter,
    a part of the semitransparent resin plate of the document size indication section corresponding to the letter presenting portion has a smaller thickness than a part of the document size indication section other than the part thereof corresponding to the letter presenting portion,
    the letter presenting portion of the document size indication section includes a pictorial symbol presenting portion, the pictorial symbol presenting portion being a portion of the document size indication section that presents a pictorial symbol, and
    the semitransparent resin plate constituting the document size indication section has a thickness that decreases toward a rear from a front of the pictorial symbol presenting portion.

2. The image reading device according to claim 1, wherein
    the pictorial symbol presenting portion is a portion of the semitransparent resin plate that is engraved.

3. The image reading device according to claim 1, wherein
    a part of the semitransparent resin plate surrounding the pictorial symbol presenting portion is thinner than a part of the semitransparent resin plate other than the part thereof surrounding the pictorial symbol presenting portion.

4. The image reading device according to claim 1, wherein
    when the document pressing member is opened, the document size indication section stands entirely aslant to increase reflection efficiency of the pictorial symbol presenting portion,
    when the document pressing member is closed, the entire document size indication section becomes flat along the document table, and
    the document size indication section moves in association with the document pressing member.

5. The image reading device according to claim 1, further comprising:
    a light emitting body disposed under the document size indication section; and a light guide disposed in the vicinity of the light emitting body between the light emitting body and the semitransparent resin plate constituting the document size indication section, wherein the light emitting body is turned on when the document pressing member is opened, and the light emitting body irradiates the document size indication section with light through the light guide.

6. An indication tool comprising:

an indication section; and an irradiation section configured to emit light from a back of the indication section for irradiation, wherein the indication section is constituted by a semitransparent resin plate, the indication section includes a letter presenting portion on an upper part of the indication tool, the letter presenting portion being a portion of the indication section that presents a letter including a pictorial symbol, a part of the semitransparent resin plate of the indication section corresponding to the letter presenting portion has a smaller thickness than a part of the indication section other than the part thereof corresponding to the letter presenting portion, and the semitransparent resin plate constituting the document size indication section has a thickness that decreases toward a rear from a front of the pictorial symbol presenting portion.

7. An image reading device comprising:

an image reading section configured to read an image of a document;

a document table that is located above the image reading section and on which the document is to be loaded;

a document pressing member provided over the document table in an openable and closable manner to press the document; and a document size indication section located on the document table and configured to indicate a plurality of document sizes, wherein the image reading section includes a frame having a central opening, the document size indication section is constituted by a semitransparent resin plate and includes a letter presenting portion, the letter presenting portion being a portion of the semitransparent resin plate that presents a letter, a part of the semitransparent resin plate of the document size indication section corresponding to the letter presenting portion has a smaller thickness than a part of the document size indication section other than the part thereof corresponding to the letter presenting portion, the letter presenting portion of the document size indication section includes a pictorial symbol presenting portion, the pictorial symbol presenting portion being a portion of the document size indication section that presents a pictorial symbol, and the semitransparent resin plate constituting the document size indication section has a thickness that increases toward a rear from a front of the pictorial symbol presenting portion.

8. An image reading device comprising:

an image reading section configured to read an image of a document;

a document table that is located above the image reading section and on which the document is to be loaded;

a document pressing member provided over the document table in an openable and closable manner to press the document; and a document size indication section located on the document table and configured to indicate a plurality of document sizes, wherein the image reading section includes a frame having a central opening, the document size indication section is constituted by a semitransparent resin plate and includes a letter presenting portion, the letter presenting portion being a portion of the semitransparent resin plate that presents a letter, a part of the semitransparent resin plate of the document size indication section corresponding to the letter presenting portion has a smaller thickness than a part of the document size indication section other than the part thereof corresponding to the letter presenting portion, the letter presenting portion of the document size indication section includes a pictorial symbol presenting portion, the pictorial symbol presenting portion being a portion of the document size indication section that presents a pictorial symbol, and a part of the semitransparent resin plate surrounding the pictorial symbol presenting portion is thinner than a part of the semitransparent resin plate other than the part thereof surrounding the pictorial symbol presenting portion.

* * * * *